(12) United States Patent
Jang et al.

(10) Patent No.: US 7,162,379 B2
(45) Date of Patent: Jan. 9, 2007

(54) ELECTRONIC POWER-MEASUREMENT DEVICE WITH INTELLIGENT AGENT

(75) Inventors: Moon Jong Jang, Daejeon (KR); Sun Ik Kim, Daejeon (KR); Jin Ki Lee, Daejeon (KR); Sun Ku Cho, Daejeon (KR)

(73) Assignee: Korea Electric Power Corporation (KR)

( * ) Notice: Subject to any disclaimer, the term of this patent is extended or adjusted under 35 U.S.C. 154(b) by 0 days.

(21) Appl. No.: 11/259,488

(22) Filed: Oct. 26, 2005

(65) Prior Publication Data
US 2006/0095209 A1    May 4, 2006

(30) Foreign Application Priority Data
Oct. 29, 2004  (KR) ...................... 10-2004-0087510

(51) Int. Cl.
*G01R 21/00* (2006.01)
(52) U.S. Cl. .................................................. 702/60
(58) Field of Classification Search .................. 702/60
See application file for complete search history.

(56) References Cited

U.S. PATENT DOCUMENTS

| 6,262,672 B1 * | 7/2001 | Brooksby et al. ........ 340/870.1 |
| 6,871,150 B1 * | 3/2005 | Huber et al. ................... 702/62 |
| 2004/0070517 A1 * | 4/2004 | Ehrke et al. ........... 340/870.02 |

\* cited by examiner

*Primary Examiner*—John Barlow
*Assistant Examiner*—Demetrius R. Pretlow
(74) *Attorney, Agent, or Firm*—Cantor Colburn LLP

(57) ABSTRACT

An electronic power-measurement device with intelligent agent includes a power measurement unit, an intelligent agent and a communication unit. The device can commonly assess data necessary for works, as an intelligent agent is mounted on the electronic power-measurement device, although the manufacturers of the devices and hardware structure based on types of the devices are different from each other. Also, the device can select only data suitable to a high level service and can selectively assess thereto, in order to minimize extraction of unnecessary data when assessing data necessary for works, as the entire data structure is previously designed in tree form, such that each step of the tree can be used as address assess to corresponding data.

3 Claims, 4 Drawing Sheets

ELECTRONIC POWER-MEASUREMENT DEVICE WITH INTELLIGENT AGENT

BACKGROUND OF THE INVENTION

1. Field of the Invention

The present invention relates to an electronic power-measurement device, and more particularly to an electronic power-measurement device with an intelligent agent which is capable of being used in fields, such as electricity billing, in which an electricity provider provides electrical power to consumers, reads an electric meter, and then bills the consumers, a reference field of data of the electronic power-measurement device as a meter reader visits a corresponding site, remote inspection of electronic meters through various networks, such as a wireless network or a wired network, a power line communication network, etc., and a field for various additional-services using electrical power which are created in the future.

2. Description of the Related Art

Prior art electronic power-measurement devices have been implemented with an inherent hardware structure based on manufacturers thereof. The electronic power-measurement devices have disadvantages in that users must understand data structures depending on their hardwares in order to collect data for inspecting electronic meters or power additional-services. Therefore, when a meter reader visits a site and refers to data collected by the electronic power-measurement devices, he must previously understand hardware structures of the electronic power-measurement devices based on manufacturers thereof.

However, even if the meter reader previously understood the hardwares of the devices based on the manufacturers thereof, most of the devices do not have a function that desired data cannot be selectively provided to him, such that the meter reader is forced to collect all data, regardless of utility. Therefore it takes a long time to read an electronic power-measurement device, thereby increasing workload.

Also, since even unnecessary data are kept, many storage devices are needed. In addition, since only a necessary part of a large amount of collected data is selectively processed, expensive equipment with a large capacity are required.

Especially, in communication networks with a limited communication bandwidth, such as a wireless Internet or a low speed power line communication, when a large amount of data is transmitted thereto, probability of transmission error is increased thereby. Therefore, in order to prevent such a problems, greater communication overhead must be ensured. Such a situation causes deterioration of transmission efficiency when transmitting a large amount of data thereto, and high communication costs due to such relatively long communication time. Also, in an unstable communication environment, a large amount of data may not be transmitted thereto, such that the remote inspection of a meter cannot be performed.

Due to the above-mentioned problems, the prior art technology cannot easily perform the remote inspection of a meter since it can read only a relatively small amount of data of inspection of a meter while communication speed is reduced to a relatively slow speed to increase reliability of a communication network. Also, it has a drawback in that, when creating power additional-services, previously installed electronic power-measurement devices must be replaced with new devices complying with specific services.

Furthermore, in order to perform higher-level services such as remote inspection of a meter, additional works to assess internal data must be implemented based on manufacturers of the electronic power-measurement devices. Repair and maintenance, such as occurrence of current state or important event of the power-measurement device, must be additionally implemented.

As mentioned above, the prior art electronic power-measurement devices have disadvantages in that, when users access data, they must previously recognized hardware structures of the devices based on types and manufactures of the devices. Therefore, in a state wherein various types of electronic power-measurement devices are employed, when various power additional-services are performed through the remote inspection of the devices, the users must understand the hardware structures of the manufacturers and types of the devices each time. Also, when each system is developed, a common interface must be additionally developed too. In order to reduce such a burden and allow the hardware structure of each manufacturer as its know-how, the present invention is implemented such that an intelligent agent is mounted in the electronic power-measurement device to commonly assess data necessary for works, although the manufacturers of the devices and hardware structure based on types of the devices are different from each other.

Also, in order to minimize extraction of unnecessary data when assessing data necessary for works, as entire data structure of the device is previously designed as a tree form, such that each step of the tree can be used as address assess to corresponding data. As such a structure is employed, it is possible to select only data suitable to a high level service and selectively assess thereto. When communication infra with a relatively high speed is constructed through grouping of data assess, such environment can be maximally used.

SUMMARY OF THE INVENTION

Therefore, the present invention has been made in view of the above problems, and it is an object of the present invention to provide an electronic power-measurement device with an intelligent agent which is capable of commonly assessing data necessary for works, as an intelligent agent is mounted in the electronic power-measurement device, although the manufacturers of the devices and hardware structure based on types of the devices are different from each other, of selecting only data suitable to a high level service and of selectively assessing thereto, in order to minimize extraction of unnecessary data when assessing data necessary for works, as entire data structure is previously designed as a tree form, such that each step of the tree can be used as address assess to corresponding data.

In accordance with the present invention, the above and other objects can be accomplished by the provision of an electronic power-measurement device with an intelligent agent comprising a power measurement unit, an intelligent agent, and a communication unit.

Here, the intelligent agent includes a device protocol interface for performing data conversion such that the power measurement unit and the intelligent agent can recognize the data therebetween, a data communication unit for supporting data communication between the power measurement unit and the intelligent agent, a communication module controller for independently supporting a communication module when performing data communication with an external system, an agent engine for controlling and monitoring the electronic power-measurement device, in which the agent engine has a microprocessor and a memory unit, and an agent dedicated database for maintaining data group related to measurement and added services, and storing created, changed and deleted data therein.

Therefore, the electronic power-measurement device with an intelligent agent according to the present invention can commonly assess data necessary for works, as an intelligent agent is mounted in the electronic power-measurement device, although the manufacturers of the devices and hardware structure based on types of the devices are different from each other, can select only data suitable to a high level service, and can selectively assess thereto, in order to minimize extraction of unnecessary data when assessing data necessary for works, as entire data structure is previously designed as a tree form, such that each step of the tree can be used as address assess to corresponding data.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

With reference to the attached drawings, a preferred embodiment of the present invention is described in detail below.

First of all, the configuration of an electronic power-measurement device with an intelligent agent according to the present invention is described.

Figure 1:
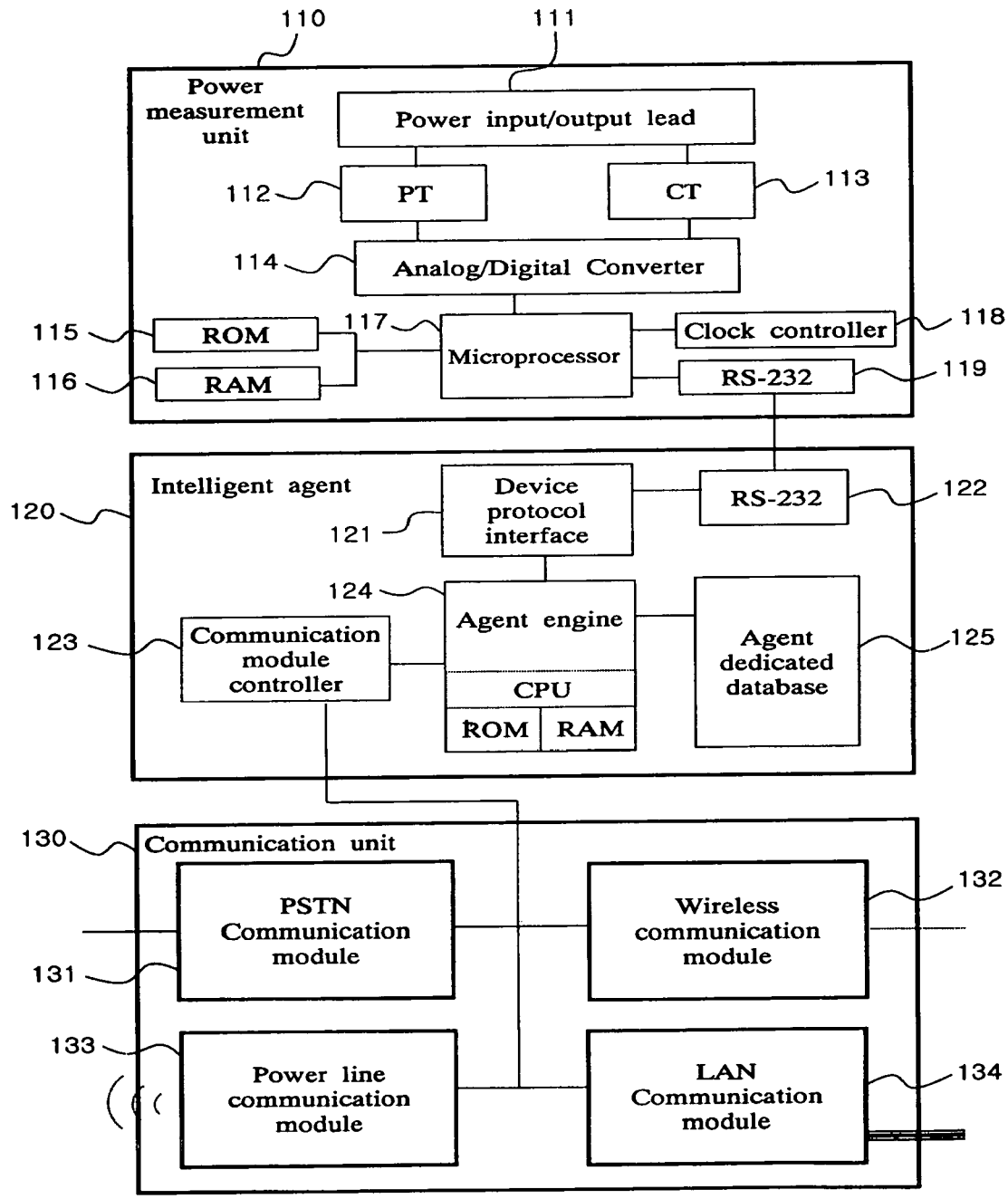
FIG. 1 is a schematic block diagram of an electronic power-measurement device with an intelligent agent according to the present invention.

As shown in FIG. 1, the device according to the present invention includes a power measurement unit 110, an intelligent agent 120, and a communication unit 130.

The power measurement unit 110 includes a power input/output lead 111 which has a power supply and a power output unit (not shown), a voltage sensing unit for sensing a voltage, which is referred to as PT 112, a current sensing unit for sensing a current, which is referred to as CT 113, an analog/digital (A/D) converter 114 for converting an analog measurement value to a digital value, a ROM 115 serving as a memory for the power measurement unit 110, a microprocessor 117 for controlling measurement and data input/output, a clock controller 118 having a clock and a timer, and an RS-232 119 for performing data communication with an external module.

The intelligent agent 120 includes a device protocol interface 121 for performing data conversion such that the power measurement unit 110 and the intelligent agent 120 can exchange data therebetween, a data communication unit 122, for example, an RS-232 communication unit, for enabling data communication between the power measurement unit 110 and the intelligent agent 120, a communication module controller 123 for independently supporting a communication module when performing data communication with an external system, and an agent engine 124 for controlling and monitoring the electronic power-measurement device, in which the agent engine 124 has a microprocessor and a memory unit. Also the intelligent agent 120 includes an agent dedicated database 125 for maintaining data groups related to measurement and added services, and storing created, changed and deleted data therein.

The communication unit 130 includes a PSTN communication module 131 for supporting a wired communication network, such as a telephone network, a wireless communication module 132 for supporting a wireless communication network such as a CDMA network, a LAN communication module 133 for supporting a local area network, such as a network for RF signals, and a power line communication module 134 for performing data communication through a power line. The communication unit 130 can selectively include communication modules as occasion demands based on four communication methods. Also, the communication unit 130 can be configured such that it is combined with other communication modules capable of performing data communication. In addition the communication unit 130 can be replaced with the other communication modules supporting such similar functions.

Figure 2:
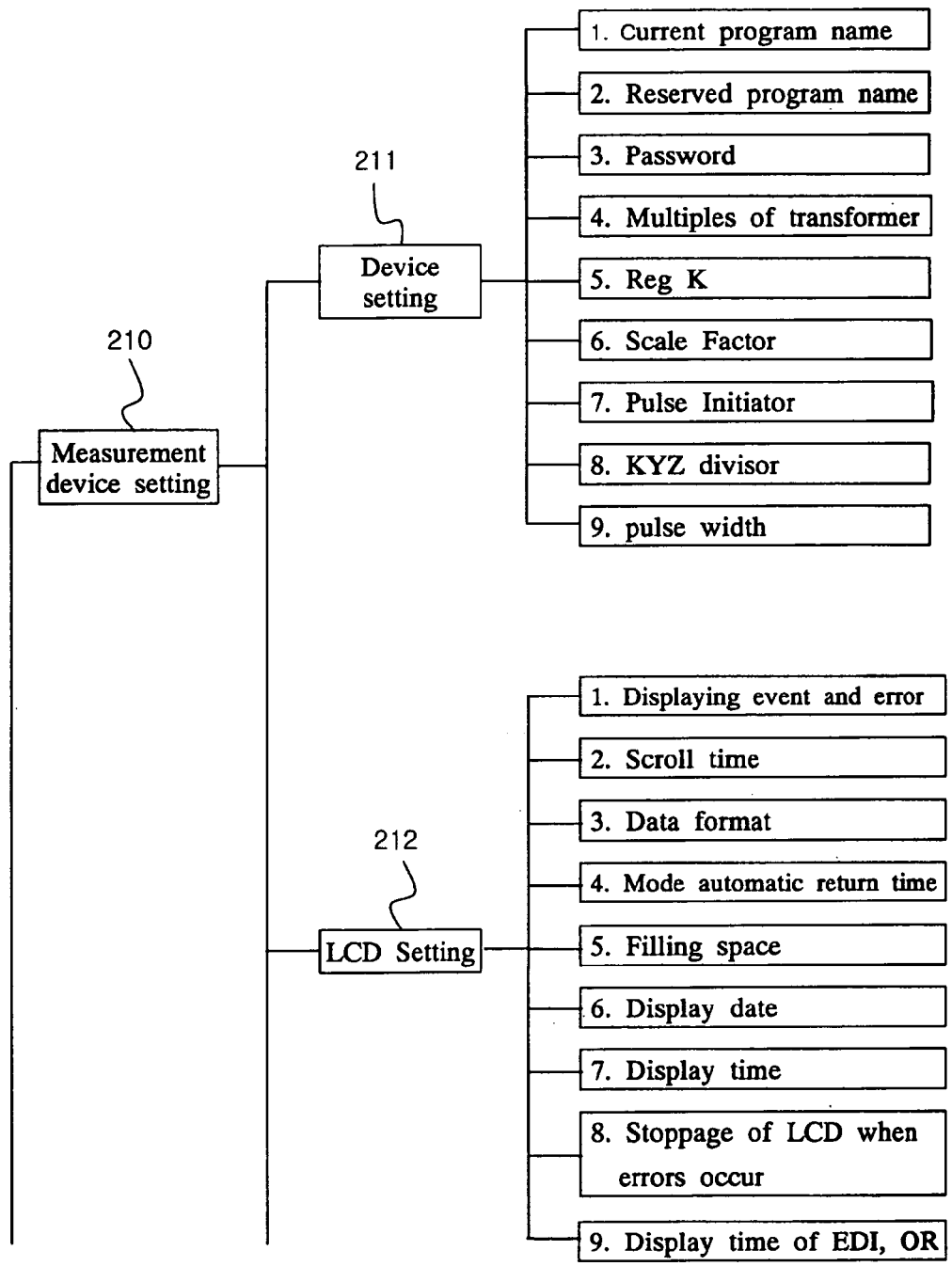
FIG. 2 is a view illustrating a structure of data managed by the electronic power-measurement device with an intelligent agent according to the present invention.
Figure 2:
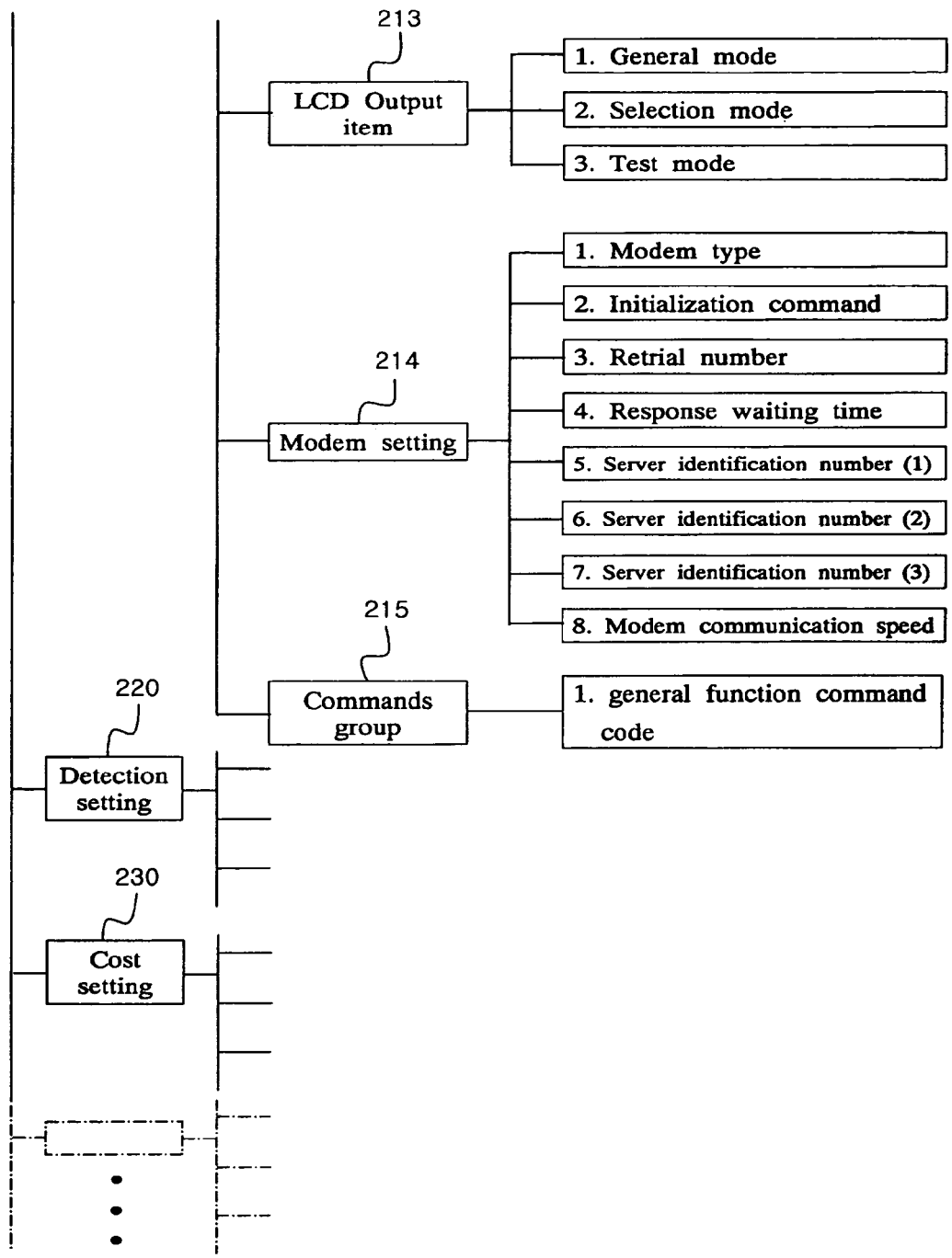

Especially, as shown in FIG. 2, the agent dedicated database 125 groups some data of the power measurement unit—into a tree structure, in which some data is required to be managed by the intelligent agent 120, such that a specific item or group can be easily managed.

More specifically, the highest level includes a measurement device setting 210, a detection setting 220, a cost setting 230, a device state (not shown), inspection data (not shown), maximum demand power data (not shown), a reserved device setting (not shown), a reserved inspection setting (not shown), and a reserved cost setting (not shown).

The measurement device setting 210, as the second-highest level, includes a device setting 211, an LCD setting 212, a LCD output item 213, a modem setting 214, and a command group 215. With such a configuration, when the intelligent agent 120 attempts to assess a specific object, it can be easily performed as codes from high stage to low stage are used.

For example, when the intelligent agent 120 attempts to assess a current program name an object value corresponding to the current program name can be processed as a code, 1.1.1.

Figure 3:
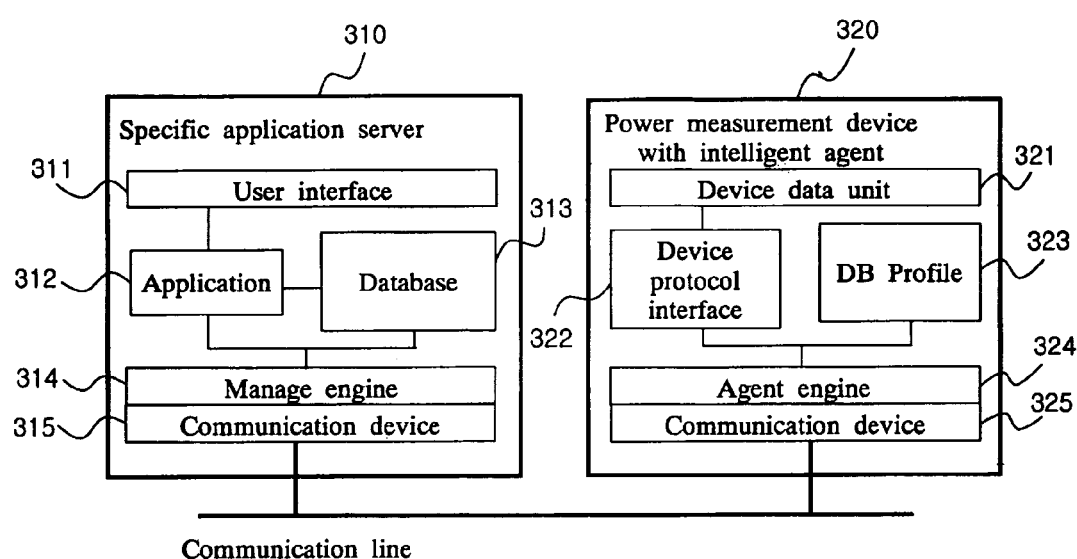
FIG. 3 is a view illustrating an electronic power-measurement device with an intelligent agent according to the present invention and a system including a specific application server using the agent.

Referring to FIG. 3, operations of the present invention are described in detail below.

Basically, the operations can be easily appreciated when considering that the electronic power-measurement device 320 with an intelligent agent is effectively operated a system including the electronic power-measurement device 320 and a specific application sever 310 using an agent.

In the system configured as shown in FIG. 3, a specific application is firstly implemented to include a user interface 311 suitable in an application, an application function 312, a database 313, and a management engine 314. Similarly, the power-measurement device 310 is implemented to include a device data unit 321 which are suitable in the application and generated in the power-measurement device, a device protocol interface 322 for performing format conversion, such that the agent and the device data unit 321 can communicate, a DB profile 323 for an agent, and an agent engine 324. It has flexibility such that necessary functions can be added later, the given functions can be modified, and unnecessary functions can be deleted therefrom.

In a normal state, the agent engine 324 manages corresponding variables in such a manner that it monitors the device data unit 321 needed in the application and updates the DB profile 323 when the device data unit 321 is modified. After that, when the agent engine 324 receives a request from the management engine 314, it performs a corresponding transaction.

Also, the agent engine 324 supports an active response that, when a serious situation occurs in the power-measurement device currently managed, the agent engine 324 processes such a situation and reports thereto. For example, when serious changes affecting the states of the device, such as phase loss, demand reset, program reset, etc., occur in the power-measurement device, they can be promptly reported to the management engine 314 such that necessary action can be taken. Especially, it supports a positive response that, regarding situations related to consumer safety, such as current leakage or conduction, or related to billing, power is interrupted through a remote switching function.

More specifically, a preferred embodiment of the present invention is described in detail below.

Regarding a remote inspection system according to a first embodiment of the present invention, a specific application server 310 serves as a remote inspection sever. Also, the electronic power-measurement device 320 with an intelligent agent according to the present invention includes a function of an agent engine 324 for supporting remote inspection, a DB profile 323 for an agent, and a device data unit 321.

Regarding Regular Inspection:

The agent engine 324 collects inspection data items from the device data unit 321, in which the inspection data items are requested by the management engine 314 for electricity billing, and then stores the items as a value according to predetermined periods in the DB profile 323 for an agent. After that, the agent engine 324 transmits the value through the communication device 325 thereto on a predetermined date and at a predetermined time, and stores the same in the database 313. Afterwards, the application function 312 performs communication of information necessary for electricity billing on the basis of the value with the user interface 311. Also, state information of the power-measurement device can be transmitted thereto for regular inspection and maintenance, or can be selectively transmitted thereto when serious events occur therein. Especially, the DB profile 323 for an agent stores information necessary for maintenance, such as ON/OFF of the power-measurement device, failure/suspension of power, etc., as its own history, such that the power-measurement device can be easily managed.

According to another embodiment of the present invention, when maximum demand-management work is processed, the specific application server 310 serves as a maximum demand-management sever. Also, the electronic power-measurement 320 with an intelligent agent according to the present invention includes a function of an agent engine 324 for supporting the maximum demand-management work, a DB profile 323 for an agent, and a device data unit 321.

When the management engine 314 for maximum demand management requests peak load in real-time to the agent engine 324, the agent engine 324 transmits, in real-time, a peak load value of the DB profile 323 for an agent to the management engine 314 through the communication device 325, such that the management engine 314 can store the value in the database 313. Afterward, the application function 312 performs communication of necessary services with the user interface 311, using the value. Also, like the first embodiment of the present invention, state information of the power-measurement device can be transmitted thereto for regular inspection and maintenance, or selectively transmitted thereto when serious events occur therein.

As apparent from the above description, the present invention provides an electronic power-measurement device to which an intelligent agent is mounted, such that a specific hardware has an independent structure. Therefore, the electronic power-measurement device can construct a remote inspection system having a wide variety of functions, and add various power-added services, which will be created in the future, thereto. Also, since each manufacturer of the power-measurement devices can keep know-how related to manufacture of each of the power-measurement devices, the present invention can make it easy for developers of the power measurement devices to enter the market.

Also, since specific data can be separately assessed as data is configured in tree form, communication networks, whose communication bandwidths are limited, such as a wireless internet or a low speed power-line communication network, can transmit only data necessary for corresponding works thereto. Therefore, probability of transmission error is greatly reduced and unnecessary communication overhead is decreased. In addition, necessary data can be transmitted thereto in a timely fashion to improve transmission efficiency, and communication time can be minimized to reduce communication costs. In unstable communication environments, only a small amount of data and need be transmitted thereto, thereby minimizing effect of the communication environments.

Additionally, high speed communication networks, such as a dedicated network, can request the highest group of a tree form, and thus all data can be automatically transmitted thereto based on a single request. Therefore, the present invention can be easily adapted to various communication environments.

Furthermore, since repeated inspection of the power-measurement devices, which are managed by the agent, or basic works, such as processing works when serious events occur, are transferred to the agent, the present invention is not dependant on a specific power-measurement device. Also, groups of various types of power-measurement devices are given by an identical function, such that a high level application can automatically manage them.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electronic power-measurement device with an intelligent agent comprising:
   a power measurement unit (110);
   an intelligent agent (120); and
   a communication unit (130),
   wherein the intelligent agent (120) includes:
   a device protocol interface (121) for performing data conversion such that the power measurement unit (110) and the intelligent agent (120) can exchange data therebetween,
   a data communication unit (122) for enabling data communication between the power measurement unit (110) and the intelligent agent (120),
   a communication module controller (123) for independently supporting a communication module when performing data communication with an external system,
   an agent engine (124) for controlling and monitoring the electronic power-measurement device, in which the agent engine (124) has a microprocessor and a memory unit, and an agent dedicated database (125) for maintaining data groups related to measurement and added services, and storing created, changed and deleted data therein.

2. The device as set forth in claim 1, wherein the agent dedicated database (125) groups a portion of data of the power measurement device as a tree structure, in which the portion of data is necessary to be managed by the intelligent agent (120), such that a specific item or group can be easily managed.

3. The device as set forth in claim 2, wherein the highest level includes a measurement device setting, a detection setting, a cost setting, a device state, inspection data, maximum demand power data, a reserved device setting, a reserved inspection setting, and a reserved cost setting, wherein a second-highest level includes a device setting, an LCD setting, a LCD output item, a modem setting, and a command group.

* * * * *